United States Patent
Babu et al.

(10) Patent No.: US 9,846,042 B2
(45) Date of Patent: Dec. 19, 2017

(54) GYROSCOPE ASSISTED SCALABLE VISUAL SIMULTANEOUS LOCALIZATION AND MAPPING

(71) Applicant: Worcester Polytechnic Institute, Worcester, MA (US)

(72) Inventors: Benzun Wisely Babu, Worcester, MA (US); David Cyganski, Holden, MA (US); R. James Duckworth, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 14/940,704

(22) Filed: Nov. 13, 2015

(65) Prior Publication Data

US 2016/0209217 A1    Jul. 21, 2016

Related U.S. Application Data

(60) Provisional application No. 62/079,290, filed on Nov. 13, 2014.

(51) Int. Cl.
*G01C 21/20*    (2006.01)
*G01C 21/18*    (2006.01)
(Continued)

(52) U.S. Cl.
CPC ........... *G01C 21/206* (2013.01); *G01C 21/18* (2013.01); *G05D 1/027* (2013.01); *G05D 1/0251* (2013.01);
(Continued)

(58) Field of Classification Search
CPC ...... G01C 21/18; G01C 21/206; G05D 1/027; G05D 1/0274; G05D 1/0251; G06T 7/002;
(Continued)

(56) References Cited

U.S. PATENT DOCUMENTS 7,539,557 B2    5/2009  Yamauchi
9,140,555 B1 *  9/2015  Andersson ........... G01C 21/165
(Continued)

FOREIGN PATENT DOCUMENTS

WO    WO 2012 044218 A1    5/2012

OTHER PUBLICATIONS

Maimone, Mark et al., Two Years of Visual Odemetry on the Mars Exploration Rovers [online] Mar. 2007 [retrieved on May 2, 2016]. Retrieved from the Internet: <URL: http://www.robotics.jpl.nasa.gov/publications/Mark_Maimone/rob-06-0081.R4.pdf>.
(Continued)

*Primary Examiner* — Aaron L Troost
(74) *Attorney, Agent, or Firm* — Chapin IP Law, LLC

(57) ABSTRACT

An indoor localization system uses Visual Simultaneous Localization and Mapping (VSLAM) aided by gyroscope sensor information. Indoor environments pose several challenges which could cause a vision only system to fail due to tracking errors. Investigation revealed significant feature loss in a vision only system when traversing plain walls, windows and staircases. However, the addition of a gyroscope helps in handling such difficult conditions by providing additional rotational information. A portable system consisting of an Inertial Measurement Unit (IMU) and a stereo camera has been developed for indoor mapping. The images and gyroscope rates acquired by the system are stored and post-processed using Gyroscope Assisted Scalable Visual Simultaneous Localization and Mapping Algorithm.

18 Claims, 11 Drawing Sheets

(51) Int. Cl.
    *G05D 1/02*       (2006.01)
    *G06T 7/80*       (2017.01)
    *G06T 7/246*      (2017.01)
(52) U.S. Cl.
    CPC ........... *G05D 1/0274* (2013.01); *G06T 7/246*
        (2017.01); *G06T 7/85* (2017.01); *G06T*
        *2207/10012* (2013.01); *G06T 2207/30244*
        (2013.01)
(58) Field of Classification Search
    CPC ......... G06T 7/2033; G06T 2207/10012; G06T
        2207/30244
    See application file for complete search history.

(56) References Cited

U.S. PATENT DOCUMENTS

2014/0316698 A1* 10/2014 Roumeliotis ........ G01C 21/165
                                                   701/500
2017/0030722 A1*  2/2017 Kojo ................... G05D 1/0268

OTHER PUBLICATIONS

Qbo's concept and design May 4, 2010 [online]. Retrieved from the Internet <URL:http://thecorpora.com/blog/?p=75>.
International Search Report, PCT/US2015/060590, dated Mar. 3, 2016, pp. 7.

* cited by examiner

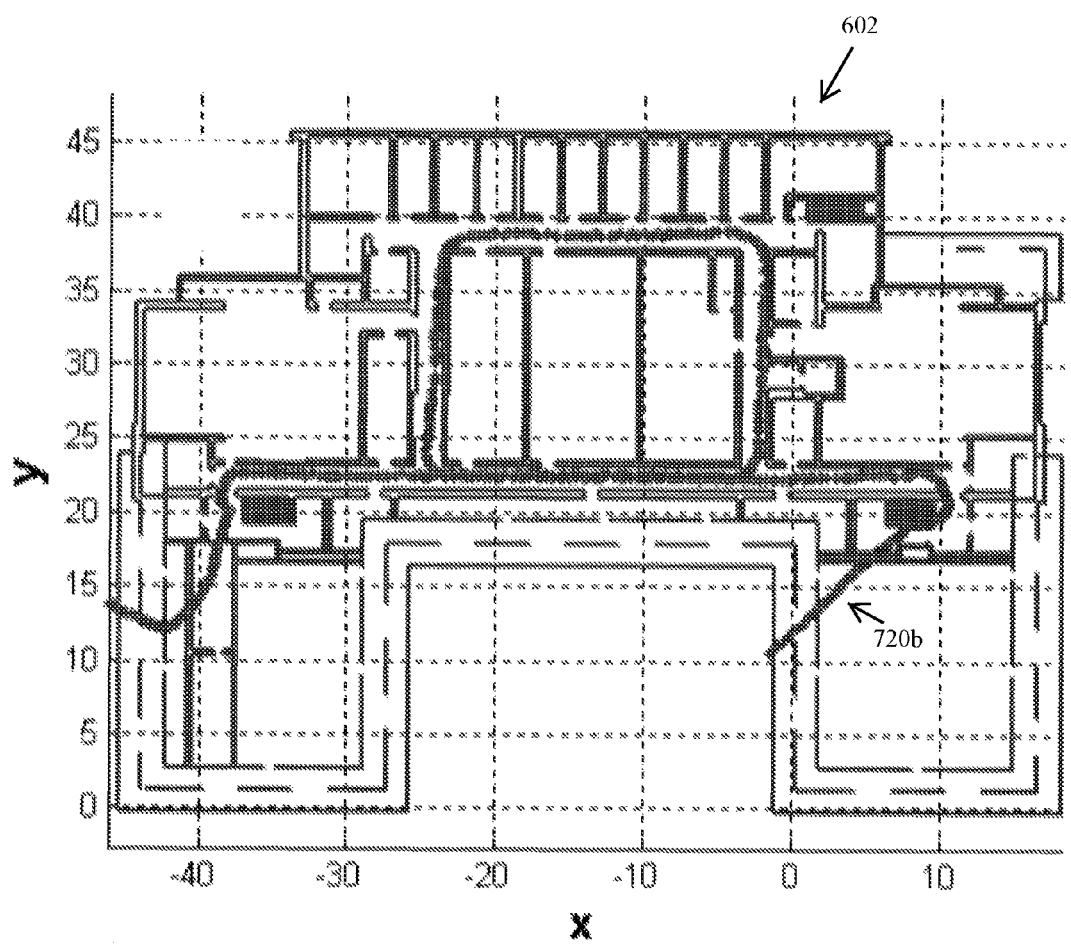
Prior Art  Fig. 7B

Prior Art  Fig. 8A

GYROSCOPE ASSISTED SCALABLE VISUAL SIMULTANEOUS LOCALIZATION AND MAPPING

RELATED APPLICATIONS

This application claims the benefit under 35 U.S.C. §119 (e) of U.S. Provisional Patent Application No. 62/079,290 filed Nov. 13, 2014, entitled "GYROSCOPE ASSISTED SCALABLE VISUAL SIMULTANEOUS LOCALIZATION AND MAPPING," incorporated herein by reference in entirety.

BACKGROUND

Electronic navigation has become popular for automotive and recreational uses, as GPS devices evolve to the consumer level. Indoor environments, however, such as for robotic uses, employ different approaches. Navigation in an unknown indoor environment requires reliable localization. Unlike outdoor environments, there is limited assistance from external agents such as GPS which provide information about the absolute position of the system. Simultaneous Localization and Mapping (SLAM) was developed to address the issue of localization in an environment where pre-cached maps and absolute pose information are not available.

Vision based SLAM (VSLAM) has gained popularity due to the availability of inexpensive cameras and low cost high speed processors. Most VSLAM algorithms rely on repeated observation of distinct features to determine the camera pose. The stereo disparity observed using nearby features provides information about translation of the camera while the disparity due to distant features provides information about the orientation, or pose, of the camera.

SUMMARY

An indoor localization algorithm using Visual Simultaneous Localization and Mapping (VSLAM) incorporates gyroscopic sensor information for enhancing and improving accuracy of localization date, particularly for indoor environments elusive to visual stimuli, such as windows, plain walls and staircases. Indoor environments often pose several challenges which tend to cause an exclusively vision-based system to fail due to tracking errors. Shortcomings of conventional vision based systems include feature loss when traversing plain walls, windows and staircases. However, the addition of a gyroscope assists in handling such difficult conditions by providing additional rotational information. A portable system consisting of an Inertial Measurement Unit (IMU) and a stereo camera is disclosed herein for indoor mapping. The images and gyroscope rates acquired by the system are stored and post-processed using a Gyroscope Assisted Scalable Visual Simultaneous Localization and Mapping approach, as discussed below. Such systems may be beneficial to first responders and robotic applications, for example, who may need to navigate unknown indoor environments in sub-optimal conditions.

Configurations herein are based, in part, on the observations that modern automated positioning approaches for robotics, navigation and other electronic location mechanisms tend to rely heavily on external stimuli such as fixed beacons and GPS satellites. Unfortunately, indoor locations can present problems with external signals, and systems relying on GPS transmissions may operate incorrectly. Vision based systems using camera input, as in a Visual Simultaneous Localization and Mapping (VSLAM) approach, suffer from the shortcoming that visual input can encounter difficulties with varying light intensities, such as windows, and with extended austere walls or repetitive textures such as brick that tend to confuse feature recognition. Accordingly, configurations herein substantially overcome the above-described shortcomings by combining a visual based approach with a gyroscopic approach for combining or coalescing the visual images with angular momentum for computing position in feature-sparse regions where a moving or panning camera captures successive frames of images separated by a known pose, or positioning, of the camera.

In an example approach disclosed below, configurations provide a system, method and apparatus for navigating an indoor environment by gathering visual information from sensors on a mobile device in the indoor environment, and retrieving angular information from the inertial measurement unit during movement of the mobile device. The approach then computes location information using the gathered visual information and the retrieved angular information.

In the example configuration shown, the inertial measurement unit (IMU) is a gyroscope adapted for retrieving inertial and angular momentum data. Computation of the location information does not require of input from a GPS (Global Positioning System) device, as such input may be erratic and/or unreliable in indoor environments. The visual information is gathered from a Simultaneous Localization and Mapping (SLAM) system, and integrated to complement the gyroscopic information from the gyroscope or similar sensor arrangement.

In further detail, configuration herein provide a method of computing a localization path through an indoor environment by retrieving visual information indicative of a location in a camera coordinate frame, and computing angular information indicative of a location in an inertial coordinate frame. A controller or processing circuitry coalesces the visual information and the angular information to compute a location, and maps the computed location to a world frame based on true locations in the indoor environment, such as using a blueprint or floorplan of actual dimensions. An output or display device then renders, based on the mapped location, the computed position in the indoor environment.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 7A and 7B show a conventional, visual only mapping of the areas of FIGS. 6a-6b, respectively;

FIGS. 8A and 8B show vertical positioning in the locating and mapping approach of FIGS. 7A-B and FIGS. 7C-D.

DETAILED DESCRIPTION

Figure 1:
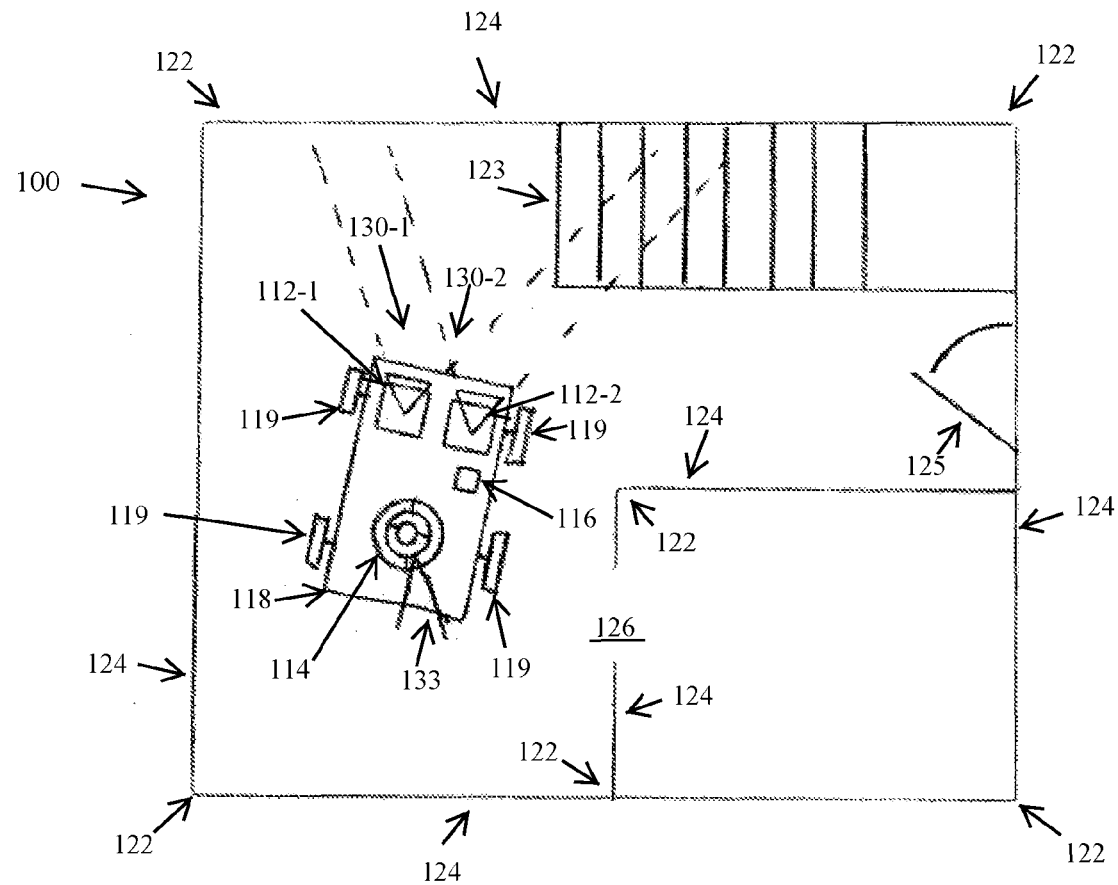
FIG. 1 is a context diagram of an indoor environment for use with configurations disclosed herein.

Depicted below is an example deployment scenario employing the gyroscopic localization and mapping system in a robotic based sensing and computing device. An example transformation through an interior space is discussed and presented in comparison to conventional vision-only based recognition approaches.

Navigation in an unknown indoor environment requires reliable localization. Unlike outdoor environments, there is limited assistance from external agents such as GPS which provide information about the absolute position of the system. Conventional Simultaneous Localization and Mapping (SLAM) was developed to address the issue of localization in an environment where pre-cached maps and absolute pose information are not available. Vision based SLAM (VSLAM) has gained popularity due to the availability of inexpensive cameras and low cost high speed processors. Most VSLAM algorithms rely on repeated observation of distinct features to determine the camera pose. The stereo disparity observed using nearby features provides information about translation of the camera while the disparity due to distant features provides information about the orientation of the camera.

However, there can be loss of features in indoor environments due to changing lighting conditions or periodically textured scenes. Such anomalies are particularly prominent while navigating through scenes containing plain walls, windows and stairs. This feature loss often leads to a tracking failure which degrades the VSLAM performance. The effect is also amplified while the system is performing a turn in indoor corridors due to sudden changes in both the sparsity and trajectory speed of the available features.

Conventional sensors that augment vision can be used to assist in overcoming this tracking shortcoming. Vision based algorithms are good at handling changes over long duration but fail to correctly observe sudden rotation rates. In contrast, a gyroscope measures accurate angular rates over short period about its axis but drifts considerably over a longer period. Hence, a combination of vision and gyroscope should complement each other and provide more robust localization including handling turns inside the building.

Configurations herein present a Gyroscope Assisted Visual Scalable Localization and Mapping approach which improves robustness and accuracy over conventional visual exclusive localization and mapping algorithm. Improvement in localization is achieved with the addition of a gyroscope. The resulting processing is tailored for indoor operation and is capable of localization at structures such as stairs, narrow corridors, and other common indoor conditions that can result in erroneous positioning while reducing long term orientation drifts.

In the discussion herein, the combination of position and orientation is referred to as the pose of an object, however this concept is sometimes used only to describe the orientation. The image data from which the pose of an object is determined can be either a single image, a stereo image pair, an image sequence, or a combination of these, where the camera is moving with a known speed.

FIG. 1 is a context diagram of an indoor environment for use with configurations disclosed herein. Referring to FIG. 1, in an indoor environment 100, a transport such as a navigation vehicle 110, or other robotic transport, hand-held wand or other manually controlled structure is disposed through the indoor environment 100. The navigation vehicle includes one or more cameras 112-1, 112-2 (112 generally), at least one gyroscope (gyro) 114, and a control module 116 on a mobile base 118 with wheels 119 and a propulsion source responsive to a control signal. The indoor environment 100 includes a variety of features 120 detectable by the cameras 112 and the control module 116, such as corners 122, stairs 123, walls 124, doors 125 and other portals 126 or openings. As the cameras 112 and the gyroscope 114 travel throughout the environment 100, visual information and angular information from the cameras 112 and gyroscope 114, respectively, are sent to the control module 116. Each of the cameras 112 receives images from a respective field of view 130-1, 130-2. The gyroscope 114 gathers information pertaining to angular rotation 132 and may include acceleration and deceleration information as well. The control module 116 includes a processor, memory, control logic and power supply for receiving and processing the visual and angular information.

Indoor localization using vision tends to be plagued by conditions where the loss of features can lead to catastrophic failure of the VSLAM algorithm. Indoor imaging conditions are highly dependent on the layout and lighting within the building. A visual SLAM solution capable of handling indoor localization needs to overcome three practical challenges presented below.

With respect to plain walls, for example, presence of texture in scenes is important for computer vision algorithms for feature identification and tracking. Plain walls and repeating brick structures are common indoor conditions lacking usable texture. Lack of distinct texture results in poor correspondence and inaccurate disparity being calculated, which prevents accurate localization and mapping.

Non-uniform brightness levels caused by windows violate the constant intensity assumption that feature detection and tracking algorithms rely on. Sudden changes in lighting near windows affect the brightness of the images and causes clipping at either white or black intensity extremes. Thus based on the exposure time, either the indoor environment or the scene outside the window is prominent. This sudden change in the imaging condition can lead to loss of features being tracked and introduce error into the system.

Another processing anomaly is introduced by staircases. Large depth variations in a local image neighborhood combined with significant camera motion prevents successful tracking. Staircases have features which lie on a plane nearly perpendicular to the imaging plane. As this plane approaches the scene, the distribution of the features gets stretched or features disappear between video frames. Feature tracking algorithms such as cross correlation perform poorly as they depend on the feature distribution remaining approximately constant.

The challenges described are more catastrophic when encountered near turns where there is a sudden scene change (high feature velocity) which compounds the feature loss. These challenges are fundamental to image tracking in the indoor environment and can be overcome with additional properly integrated sensors. Since a gyroscope is capable of providing additional observation during a turn, an Inertial Measurement Unit (IMU) can be added to complement the vision based system.

Configurations used in the examples below include a stereo (left and right) camera arrangement. The stereo camera observations are modeled as a three dimensional vector where the first two components $u_l$, $v_l$ represent the pixel location as observed by the left camera. The third component $u_r$ is the feature's pixel location within the corresponding row in the right camera frame:

$$\hat{z}_b(T_i, X) = \begin{pmatrix} u_l \\ y_l \\ u_r \end{pmatrix} = \begin{pmatrix} f_x \frac{y_1}{y_2} + p_1 \\ f_y \frac{y_2}{y_3} + p_2 \\ f_x \frac{y_1 - b}{y_3} + p_1 \end{pmatrix}$$

where
$$y := T_i X_k$$

In equation 1, the focal length ($f_x$; $f_y$) and the camera center (p1; p2) is obtained using camera calibration. $X_k$ represents a feature observed in the world coordinate frame.

The gyroscope rates (theta) are modeled as three dimensional rotation about its axis. If (x; y; z) describe the rotation about the three axis (x; y; z). The following equation describes the gyroscope rate observed in the camera frame. The rotation rates are assumed to be corrupted by the bias noise ($n_b$):

$$\dot{\theta}_c = q2r(Q_c^{imu}) * \begin{pmatrix} \dot{\theta}_x + nb_x \\ \dot{\theta}_y + nb_y \\ \dot{\theta}_z + nb_z \end{pmatrix}$$

The quaternion ($Q^{imu}c$) describes the rotation between the IMU and the camera frame. The function q2r( ) converts a quaternion to rotational matrix.

Therefore, the example configuration depicts an arrangement in which the visual sensory device is a camera and the visual information are camera frames, and the angular sensory device is a gyroscope and the angular information is angular momentum. The positioning and locating processing includes retrieving the visual information from a stereo camera arrangement including a right camera and a left camera.

In the examples that follow, the inertial measurement unit (IMU) is a gyroscope adapted for retrieving inertial and angular momentum information (data) for incorporation and coalescing with the visual information (data). Alternate inertial sensors or measurements may also be employed. It should be noted that the location information is devoid of input from a GPS (Global Positioning System) device, as indoor environments often have difficulty propagating such signals, particularly with steel and concrete construction. The visual information is gathered from a Simultaneous Localization and Mapping (SLAM) system and includes a plurality of successive frames received from a camera. The gathered angular information is indicative of a change in pose of the camera between the frames. In general, coalescing and incorporating the gyroscopic data includes performing feature detection on the retrieved visual information to determine feature positions, and identifying features common to one or more of the plurality of frames. The controller 116 than computes a location based on the angular information when the visual information fails to distinguish sufficient features to compute a location.

Figure 2:
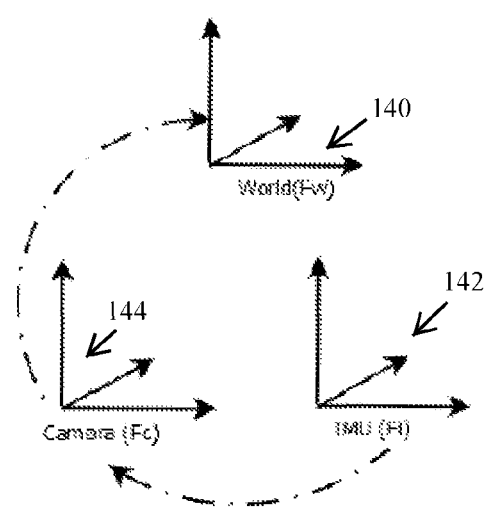
FIG. 2 shows frames of reference depicted as Cartesian systems.

FIG. 2 shows frames of reference depicted as Cartesian systems. Referring to FIGS. 1 and 2, there are three main coordinate frames in the system:
1) World frame (Fw) 140—The base frame with respect to which all the elements in the environment are defined.
2) Camera frame (Fc) 142—The frame with respect to the left camera center. All the features observed by the camera are represented in this coordinate frame initially.
3) IMU frame (Fi) 144—The frame with respect to which the IMU measurements are observed initially.

Upon retrieving visual information indicative of a location in a camera coordinate frame 144, the controller 116 computes angular information indicative of a location in an inertial coordinate frame 142, and coalesces the visual information and the angular information to compute a location. The controller 116 maps the computed location to a world frame 140 based on true locations in the indoor environment 100, thus establishing the actual "real world" location resulting from the computations. The result is rendered, based on the mapped location, a position in the indoor environment, such as on a paper or onscreen display of the interior environment showing the path and/or location traversed.

During advancement through the indoor environment 100, whether by a robotic driven mobile base 118 or manual device (i.e. walking or carried), the controller 116 receives the visual information and angular information periodically based on an advancement of the camera coordinate frame 144 and the inertial coordinate frame 142 through the indoor environment 100. The controller 116 computes the location based on relative movement of the camera coordinate frame 144 and the inertial coordinate frame 142 between the periodic receipt of the visual information and the angular information.

In the robotic configuration, a visual sensory device 112 and an angular sensory device 114 are disposed on a vehicle, such as mobile base 118, and the vehicle disposed through the indoor environment 100 for receiving the visual information and the angular information as the vehicle is disposed at different locations.

The differing frames of reference 140, 142, and 144 involve initially calibrating the camera frame 144 and the inertial frame 142 at a common location, typically a start position of the path, and computing the angular information relative to the initial calibration positioning.

In operation, calibration and initialization are performed prior to receiving visual and angular data. The cameras 112 and gyroscope 114 are disposed through the indoor environment 100 by the mobile base 118. Periodic sampling of images coupled with gyroscopic angular momentum data is gathered at regular intervals. A one time calibration procedure is needed to determine the transformation between the IMU and the camera. The transformation $T^c_{imu}$ consists of a rotation quaternion $Q^c_{imu}$ and a displacement vector $d^c_{imu}$. Since we are only interested in the gyroscope rates, the rotation quaternion between the IMU and the camera ($Q^c_{imu}$) is found using a calibration technique. Also every time the system is started, the gyroscope bias is estimated by keeping the system stationary for a 500 frame capture (approx 50 seconds).

Stereo images are captured using the narrow base-length stereo camera pair 112 while the rotational rates are captured using the 200 Hz ($f_{imu}$) gyroscope 114. To synchronize the camera 112 with the IMU, a trigger is generated for every n gyroscope observations as described in Section IV. This trigger is used to initiate a stereo image capture at rate $f_r$=200/n Hz.

In indoor environments, automatic exposure helps to capture scenes with varying lighting conditions better but this can lead to loss of IMU trigger in scenes with low lighting conditions. Since the frame rate is determined by the IMU trigger rate, the camera exposure time (texp) needs to be below the IMU trigger period (Eq.4) to ensure that an image frame is generated for every IMU trigger. For exposure time:texp<$1/f_r$.

The images and the gyroscope observations are captured using independent driver threads and stored for offline processing, to ensure that there is no loss of data from the sensors.

Figure 3:
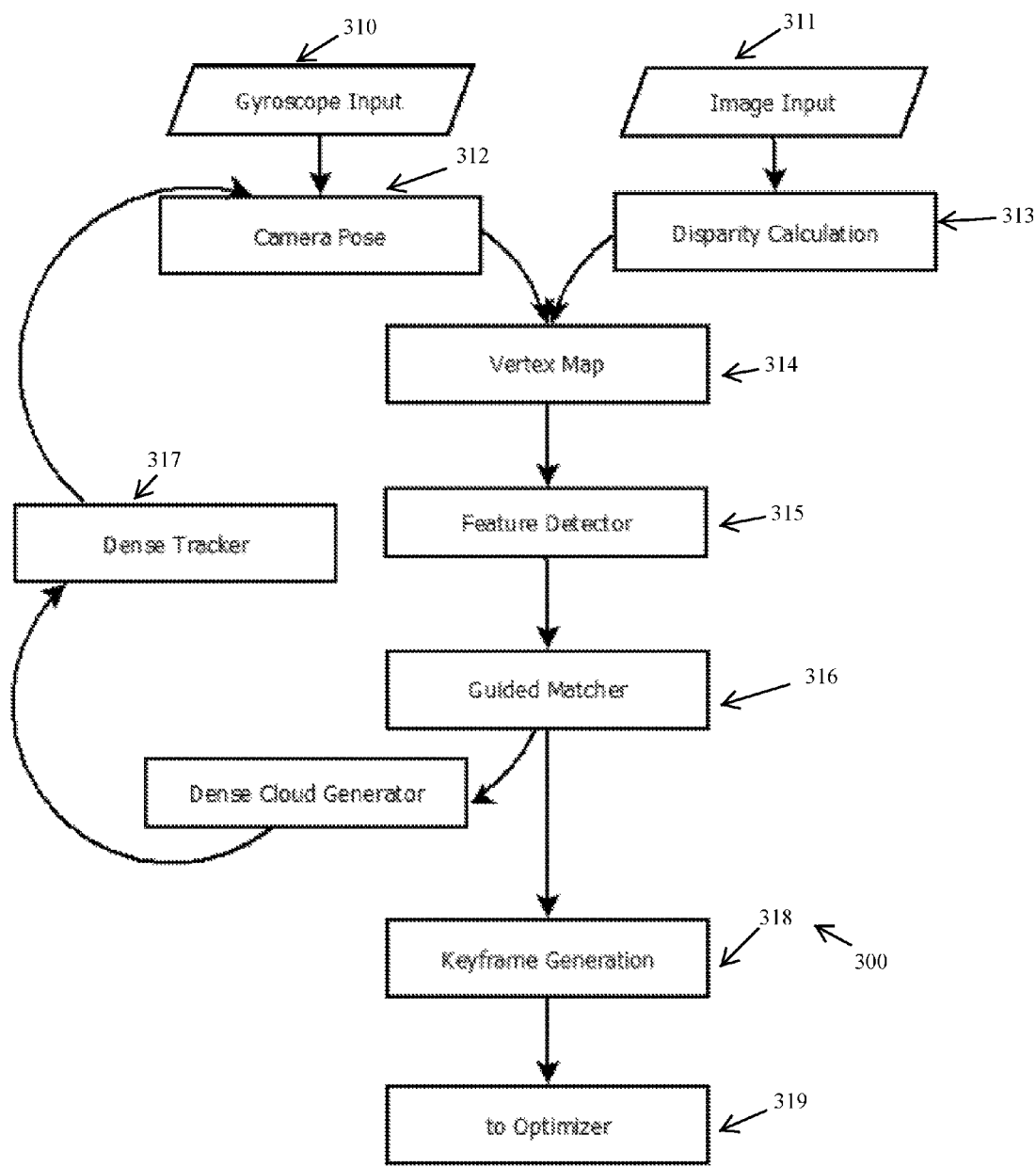
FIG. 3 shows a front end of processing from the cameras and gyroscope of FIG. 1.

FIG. 3 shows a front end of processing from the cameras and gyroscope of FIG. 1. Referring to FIGS. 1 and 3, one objective of the front end 300 is to detect features and perform an initial estimate of the pose of the camera 112 from received frames. The controller 116 receives gyroscopic input 310 and image input 311 from the gyroscope 114 and cameras 112-1, 112-2, respectively. Features from a frame are extracted using a grid based or other suitable algorithm. A disparity calculation 313 is used to determine a vertex map 314 of features, such as corners, stairs and windows. A feature detector 315 identifies the features in different frames, and a guided matcher 316 identifies corresponding features between the frames.

The pose 312 of a frame is determined using a dense tracking algorithm described below. The pose estimation 312 in the front end is used as an initial estimate in the back end (FIG. 4, below) convex optimizer. Since a convex optimizer only produces the local minima and not the global minima the initial estimate needs to be close to the actual pose. In an indoor environment, estimation of orientation by a vision only system is poor due to the lack of distant features. The gyroscope input 310 assists the front end 300 in determining the orientation. This orientation quaternion between two frames (k,k+n) can be calculated using the equation:

$$Q_{k+n}^k = Q_{k+n}^{-1} * \prod_{i=k}^{k+n} Q_i$$

The dense tracker 317 uses intensity consistency to estimate the transform between the frames. All the points in the images are used to produce an estimate of the transformation between two frames. It uses A Levenberg Marquardt (LM) algorithm, as is known in the art, to find the transformation that minimizes the back projection error of the points in the scene (images) received by the cameras 112.

The gyroscope orientation estimate is used to initialize the LM algorithm, thus making the dense tracker 317 more robust and preventing it from hanging at a local minimum.

Keyframe Generation 318 employs only a subset of the total frames observed, called keyframes. These keyframes are generated based on the duration and number of new features tracked. Tracking a greater number of features in the environment 100 gives better accuracy. In narrow corridors and corners a large numbers of features go out of field of view very quickly. Since keyframe generation 318 relies on tracking these features for a short duration, if very few or no keyframes are generated, conventional SLAM fails. To capture as many features as possible during turns, the disclosed approach increases the number of keyframes generated by relaxing the conditions for keyframe generation during turns.

The feature detector 315 is employed to detect the features in the current image. Feature matching in the front end is performed using a zero mean sum of squared difference technique. In order to improve the matching, the transform estimate from the dense tracker (V-B1) is used for predicting candidates and sample patches. Addition of the gyroscope input 310 improves the duration over which a feature is tracked and thus improves the matching accuracy. Additionally, the matches for which reprojection error is large are not used for backend optimization which prevents propagation of matching error from the front end. The selected keyframes are then passed to the backend for optimization 319.

Figure 4:
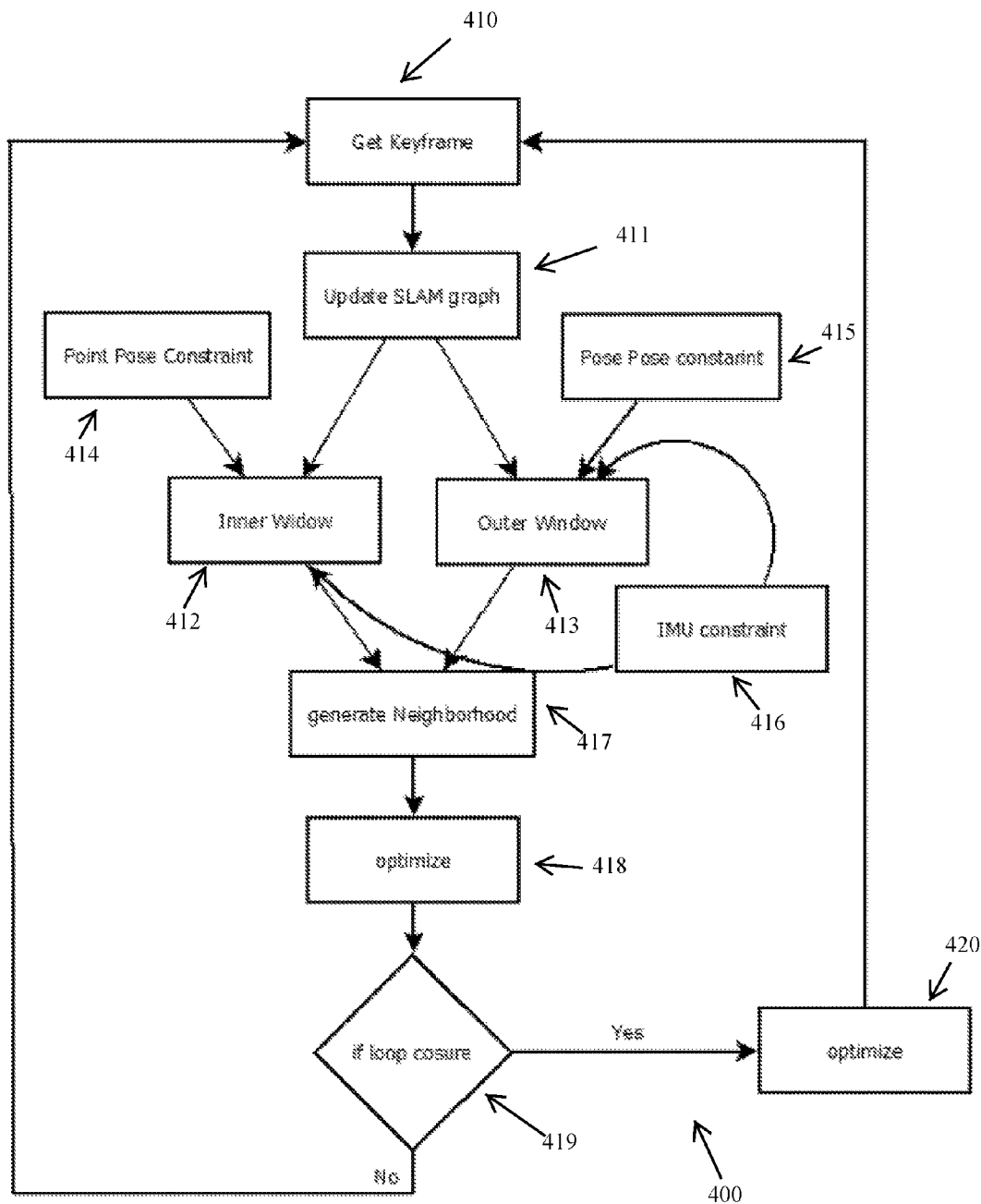
FIG. 4 shows a back end of processing from the cameras and gyroscope of FIG. 1.

FIG. 4 shows a back end of processing from the cameras and gyroscope of FIG. 1. Referring to FIG. 4, the back end 400 is responsible for generating localization information based on the motion from the beginning of the operation of the system. The back end 400 uses a graph 411 that maintains the constraints and relationships between the keyframes 410 sent by the front end 300. The keyframes based on the history are subdivided into an inner window 412 and outer window 413 sets.

In the inner window 412, the optimization function tries to minimize the feature re-projection error combined with the orientation error between the gyroscope and the visual system. The inner window 412 imposes a point pose constraint 414.

In the outer window 413 a pose-pose constraint 415 is enforced. Hence the optimization 418 function tries to minimize the predicted transformation 417 with the transformation observed from different keyframes in the path travelled by the system. Additionally, the orientation constraint as defined by the rotational change observed by the gyroscope between the keyframe is added as an IMU constraint 416 to the outer window 413.

After adding the constraints 414, 415 from the inner 412 and the outer 413 window, the objective function is represented by the Equation below. The first summation minimizes the re-projection error, the second summation minimizes the relative pose between the two frames where:

$$v_{ij} := \log_{SE(3)}(T_j^i * T_i * T_j^{-1})$$

$$\chi^2 = \sum_{z_{ik}} (z_{ik} - \hat{z}(T_i, X_k))^2 + \sum_{T_{ij}} v_{ij} \Lambda_p v_{ij} + \sum_{Q_{ij}} \exp(Q_{ij} * Q_{ji}^{imu}) \Lambda_g \exp(Q_{ij} * Q_{ji}^{imu})$$

Finally the third summation minimizes the error between the quaternion rotation given by the IMU and the observed quaternion rotation between two keyframes. In the back end, loop closure using place recognition is used. If loop closure occurs 419, an additional constraint is added to the SLAM graph. Again optimization 420 is carried out to improve the localization accuracy.

Figure 5A:
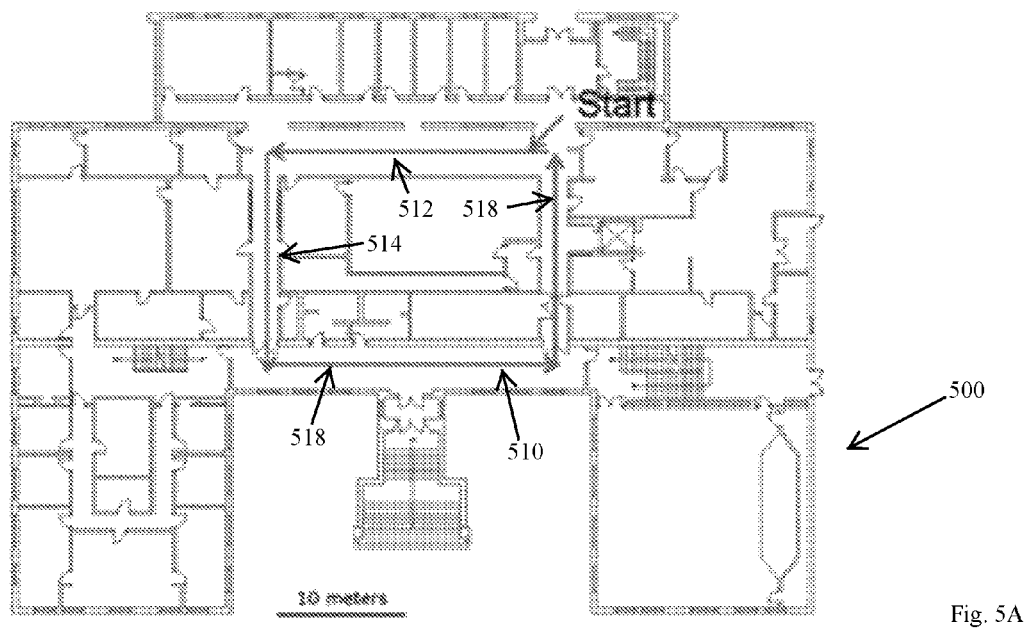
FIGS. 5A-5C show an example of locating and mapping a single floor using visual and visual combined with gyroscopic input using the processing of FIGS. 3 and 4.
Figure 5B:
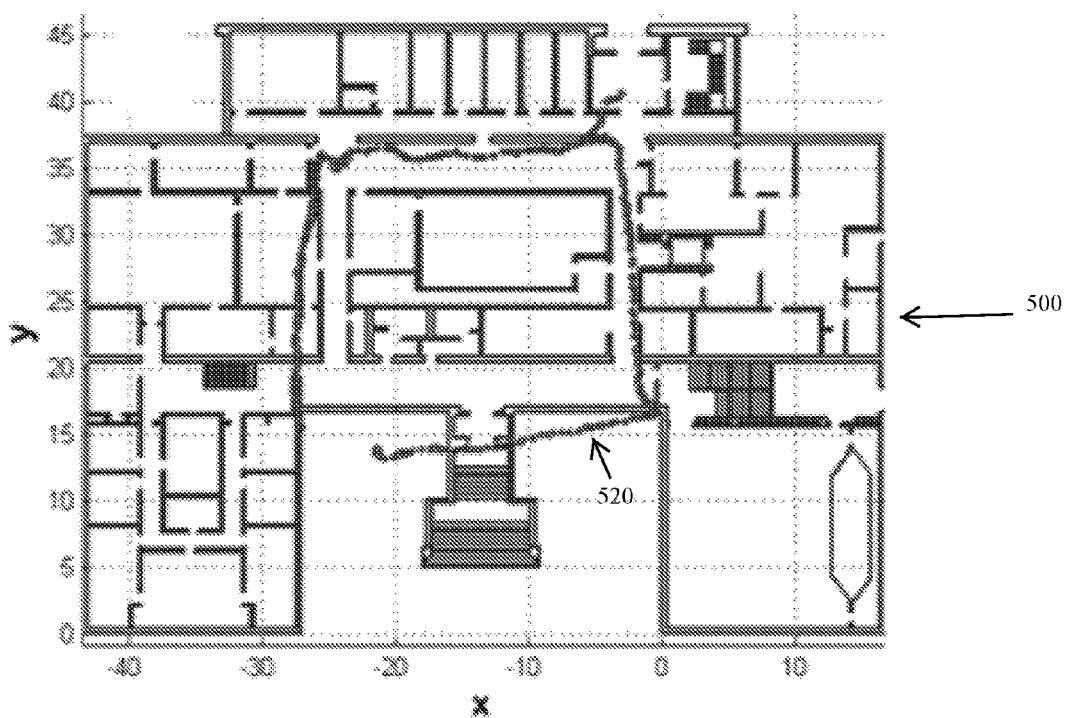
Figure 5C:
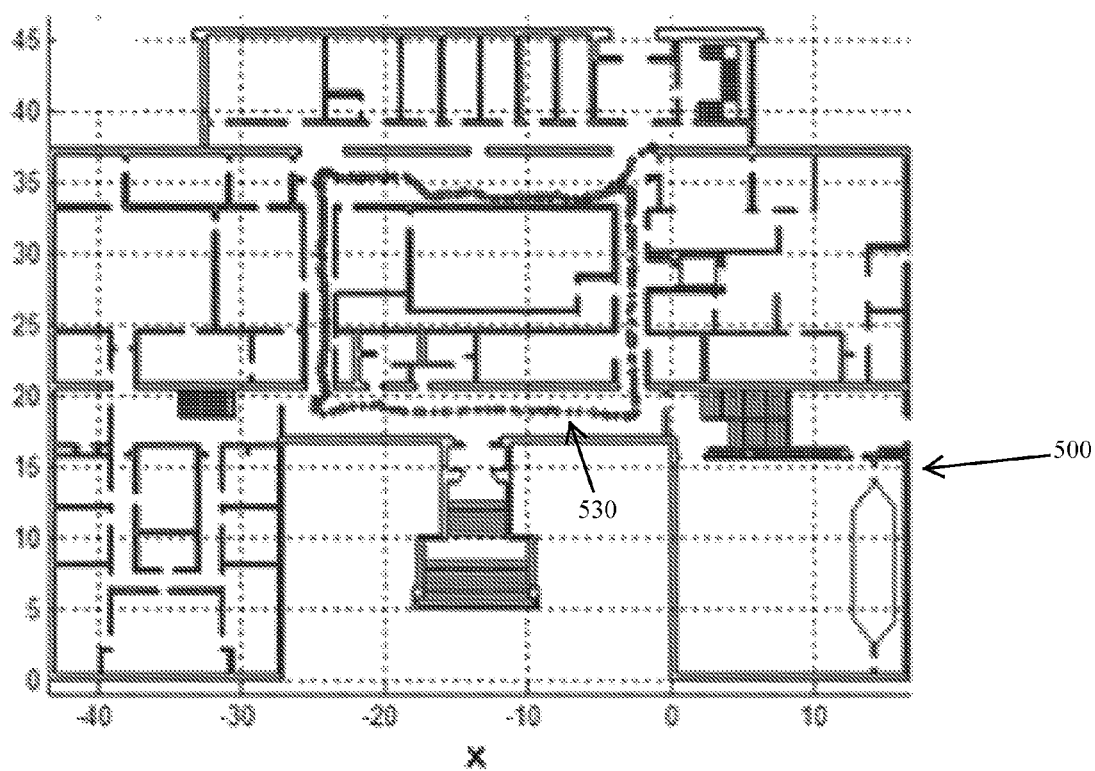

FIGS. 5A-5C show an example of locating and mapping a single floor using visual and visual combined with gyroscopic input using the processing of FIGS. 3 and 4. Referring to FIGS. 5A-5C, data-sets were collected using the hand-held device. A stereo image was generated at every 20th IMU observation (n=20). The image capture rate was 10 Hz. The structure 500 has generally wide corridors and windows, thus the dataset is characterized by wide well-lit corridors. A total distance of approximately 80 m was traveled during the test. FIG. 5A depicts an example conventional mapping and locating execution without gyroscopic input, while FIG. 5B shows gyroscopic data incorporated with visual data for mapping and locating per the approach disclosed and claimed herein.

A true path 510 includes four legs, shown by arrows 512, 514, 516 and 518. A vision only path 520 depicts the conventional computed path. In the vision only system, the turns are estimated poorly. Also there is a break in tracking due to change in lighting near the second turn where windows are located. Loop closure occurs at the end, but the propagated correction is not able to compensate for the tracking loss that occurred. In contrast, a gyroscopic assisted path 530 demonstrates a more accurate path, that accurately tracks turns and performs a successful loop closure as performed by configurations herein.

Figure 6A:
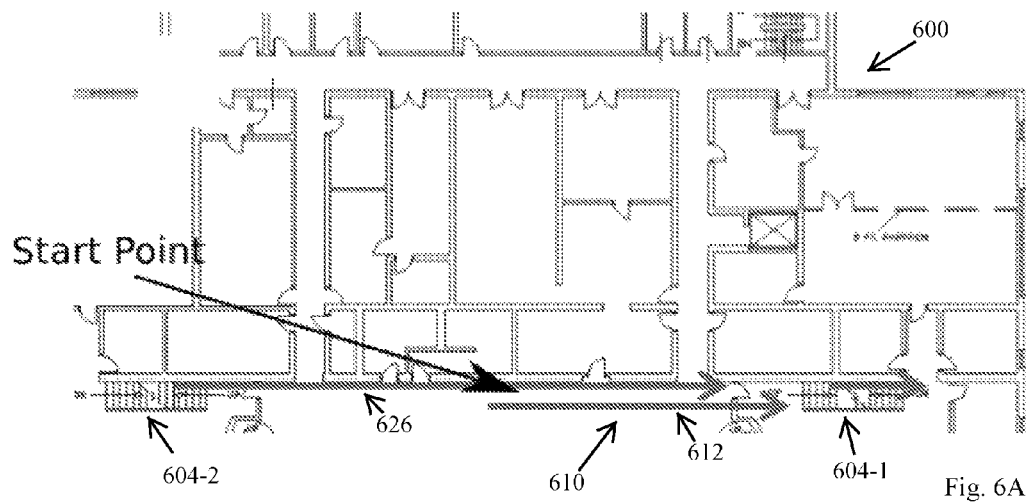
FIG. 6A-6B show an example of a multi-story area for navigation for locating and mapping.
Figure 6B:
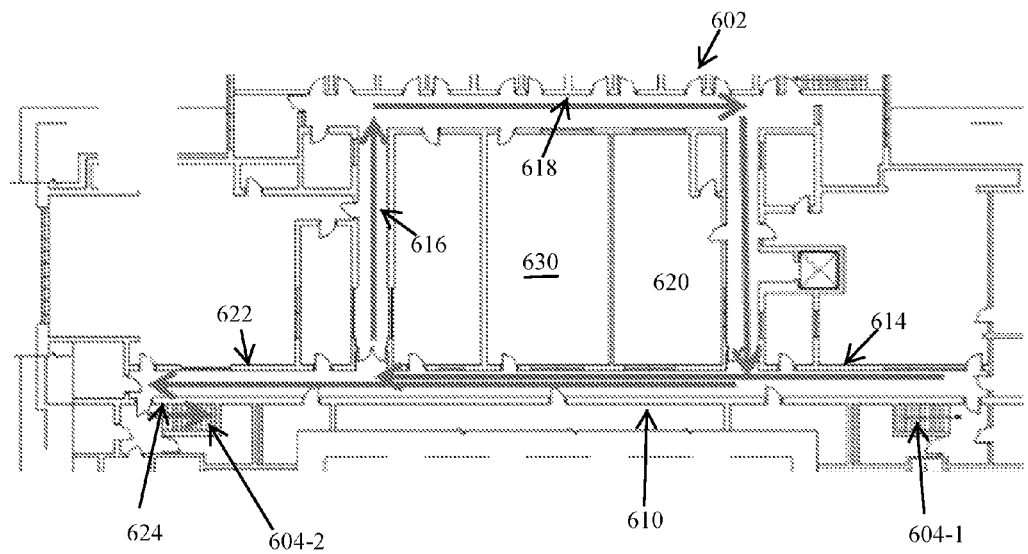

FIG. 6A-6B show an example of a multi-story area for navigation for locating and mapping. A first floor area 600 has wide corridors with windows while a second floor 602 has narrow corridors without windows. The stairs 604-1, 604-2 between the floors are moderately lit and have plain walls. A true path includes legs 612 on the first floor and up the stairs 604-1, and continues with leg 614 on the second floor, turning right around a center region 630 and continuing with legs 616, 618 and 620. A final right turn follows leg 622 back down the stairs, turning for leg 624 and concluding on the first floor with leg 626.

Figure 7A:
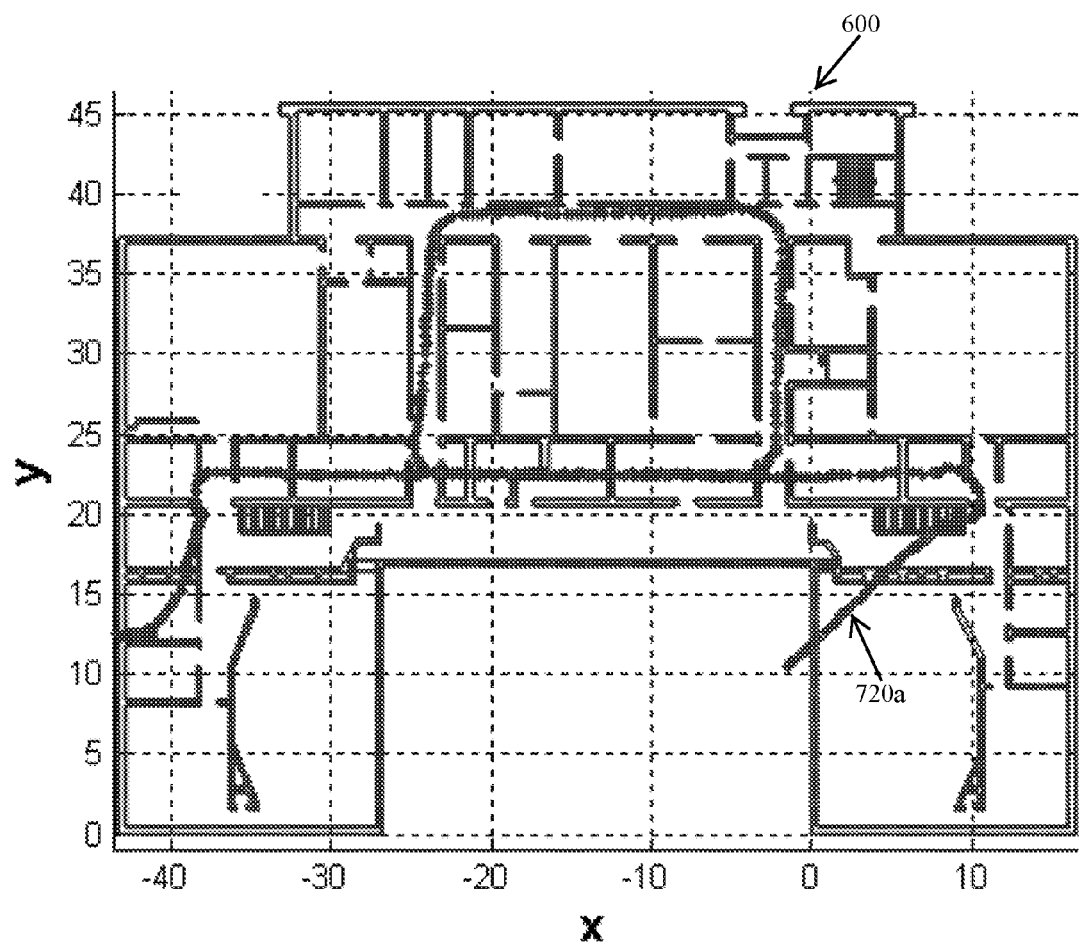

FIGS. 7A and 7B show a conventional, visual only mapping of the areas of FIGS. 6A-6B, respectively. Referring to FIGS. 6A-7B, in addition to being longer than the previous data-set gathered in 5A-C the path 610 incorporates varying lighting conditions, stairs and narrow corridors. The conventional computed path 720a and 720b depict the result overlayed on the first 600 and second 602 floors. Paths 720a and 720b indicate that the vision only system exhibits poorly while traversing stairs and only completes loop closure on the second floor. It fails to recognize the loop closure that occurs on the second floor.

Figure 7C:
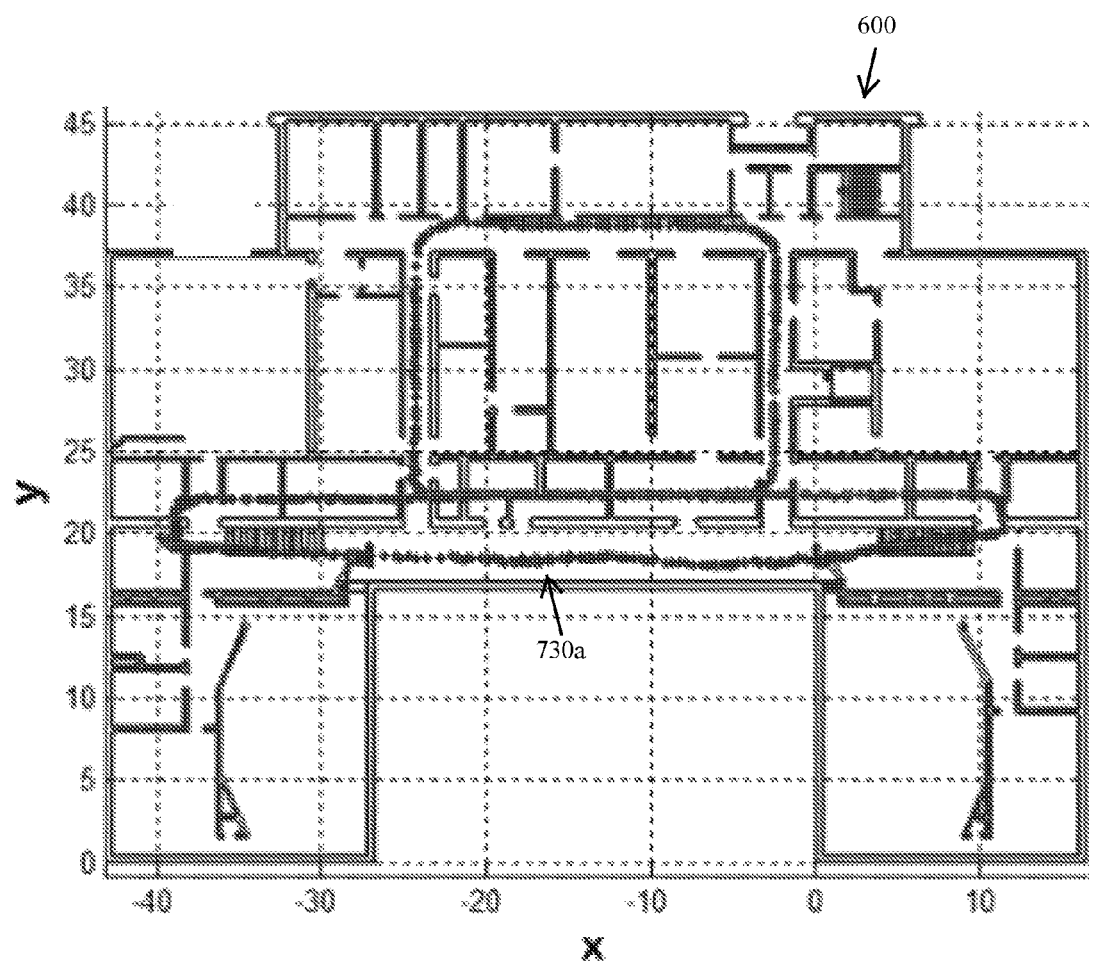
FIGS. 7C and 7D show locating and mapping using a coalescing of visual and angular information for the areas of FIGS. 6a and 6b, respectively.
Figure 7D:
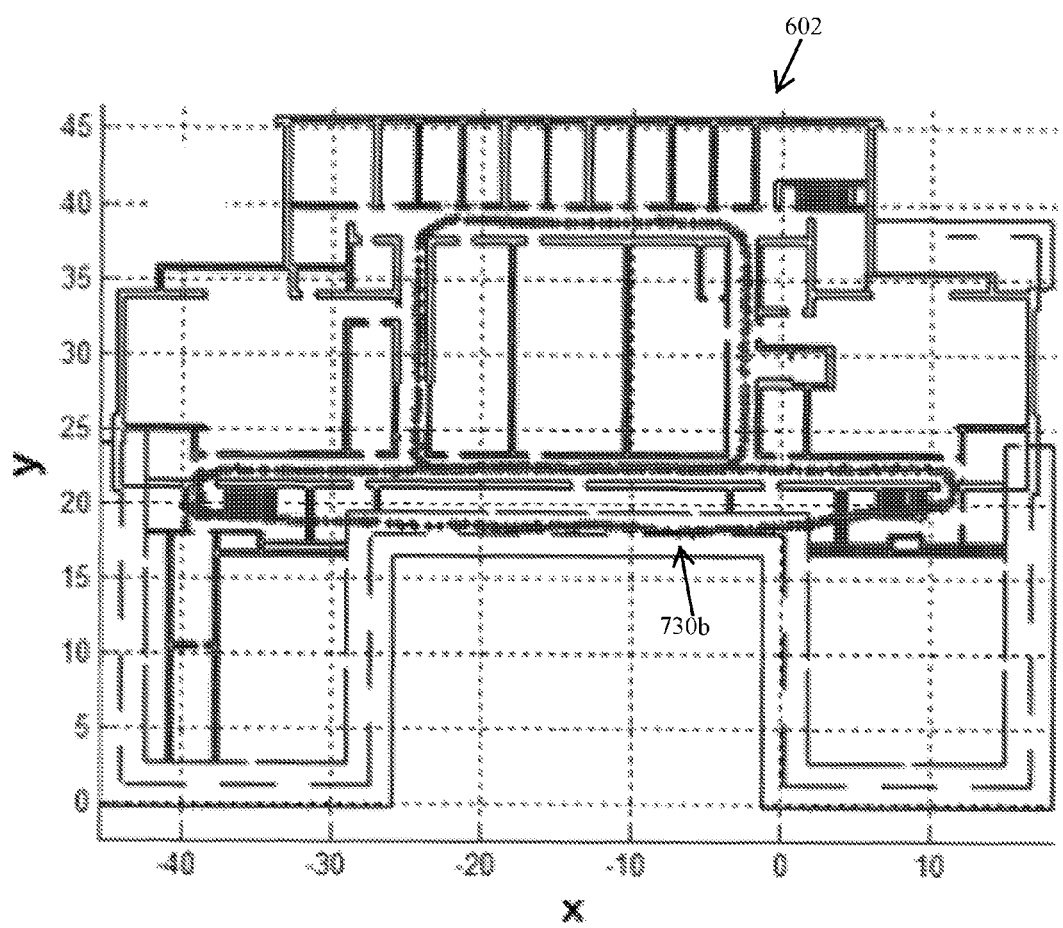
Figure 8B:
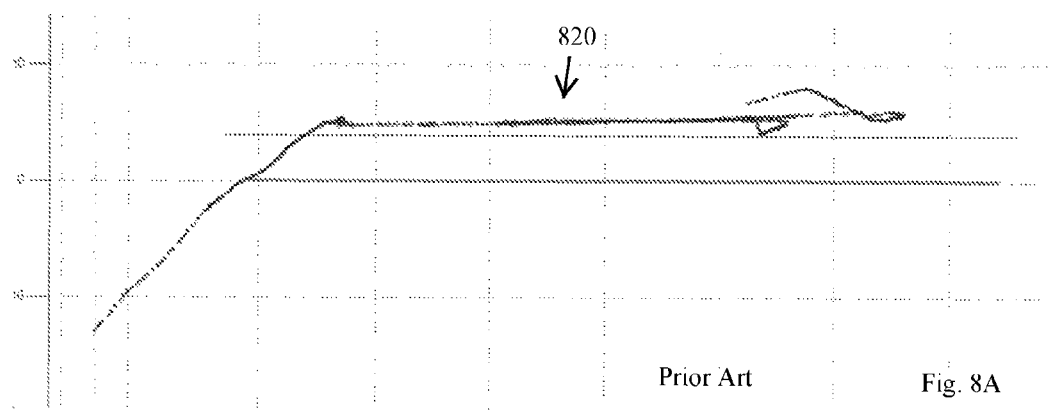
Figure 8B:
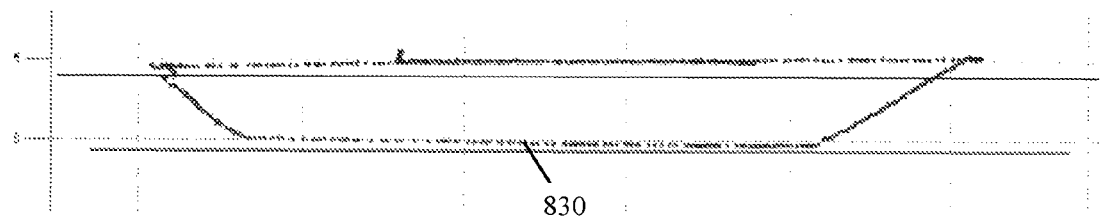

FIGS. 7C and 7D show locating and mapping using a coalescing of visual and angular information for the areas of FIGS. 6a and 6b, respectively. Computed paths 730a and 730b using visual and gyroscopic input shows substantial fidelity to the true path 610 and does not exhibit the same failures with stairs, and is able to achieve both vertical and horizontal loop closure FIGS. 8A and 8B show vertical positioning in the locating and mapping approach of FIGS. 7A and 7B and FIGS. 7C-D. Referring to FIGS. 8A-8B, the conventional approach results in computed path 820, which again appears confused by the stairs. Computed path 830 using gyroscopic and visual input accurately renders the stairs 604-1, 604-2.

Those skilled in the art should readily appreciate that the programs and methods as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of navigating an indoor environment
    gathering visual information from sensors on a mobile device in the indoor environment, the visual information including a plurality of successive frames received from the camera;
    retrieving angular information from an inertial measurement unit during movement of the mobile device, the angular information indicative of a change in pose of the camera between the frames; and
    computing location information using the gathered visual information and the retrieved angular information, further comprising:
        performing feature detection on the retrieved visual information to determine feature positions;
        identifying features common to one or more of the plurality of frames; and
        computing a location based on the angular information when the visual information fails to distinguish sufficient features to compute a location, the camera further comprising left and right cameras, computing the location information further including modeling camera observations as a three dimensional vector having a first component, a second component and a third component, wherein the first component and the second component represent a pixel location of a feature as observed by the left camera and the third component is a pixel location within a row corresponding to the feature observed by the right camera.

2. The method of claim 1 wherein the inertial measurement unit (IMU) is a gyroscope adapted for retrieving inertial and angular momentum data.

3. The method of claim 1 wherein computing the location information is devoid of input from a GPS (Global Positioning System) device.

4. The method of claim 1 wherein the visual information is gathered from a Simultaneous Localization and Mapping (SLAM) system.

5. The method of claim 1 wherein computing the location information further comprises horizontal and vertical loop closure of a traveled path in a 3-dimensional indoor environment.

6. A method of computing a localization path through an indoor environment, comprising:
    retrieving visual information indicative of a location in a camera coordinate frame, the visual information including a plurality of successive frames received from the camera;
    computing angular information indicative of a location in an inertial coordinate frame, the angular information indicative of a change in pose of the camera between the frames;
    coalescing the visual information and the angular information to compute a location, further comprising:

performing feature detection on the retrieved visual information to determine feature positions;
identifying features common to one or more of the plurality of frames; and
computing a location based on the angular information when the visual information fails to distinguish sufficient features to compute a location, the camera further comprising left and right cameras, computing the location information further including modeling camera observations as a three dimensional vector having a first component, a second component and a third component, wherein the first component and the second component represent a pixel location of a feature as observed by the left camera and the third component is a pixel location within a row corresponding to the feature observed by the right camera;
mapping the computed location to a world frame based on true locations in the indoor environment; and
rendering, based on the mapped location, a position in the indoor environment.

7. The method of claim 6 further comprising
receiving the visual information and angular information periodically based on an advancement of the camera coordinate frame and the inertial coordinate frame through the indoor environment;
computing the location based on relative movement of the camera coordinate frame and the inertial coordinate frame between the periodic receipt of the visual information and the angular information.

8. The method of claim 7 further comprising disposing a visual sensory device and an angular sensory device on a vehicle, and disposing the vehicle through the indoor environment for receiving the visual information and the angular information as the vehicle is disposed at different locations.

9. The method of claim 8 wherein:
the visual sensory device is a camera and the visual information are camera frames; and
the angular sensory device is a gyroscope and the angular information is angular momentum.

10. The method of claim 7 further comprising initially calibrating the camera frame and the inertial frame at a common location, and
computing the angular information relative to the initial calibration positioning.

11. The method of claim 7 further comprising retrieving the visual information from a stereo camera arrangement including a right camera and a left camera.

12. A device for computing a localization path through an indoor environment, comprising:
visual sensors configured to retrieve visual information indicative of a location in a camera coordinate frame, the visual information including a plurality of successive frames received from a camera;
inertial sensors configured to compute angular information indicative of a location in an inertial coordinate frame, the angular information indicative of a change in pose of the camera between the frames;
a controller coupled to the visual sensors and the inertial sensors,
the controller having memory and a processor for coalescing the visual information and the angular information to compute a location,
the controller including control logic for:
performing feature detection on the retrieved visual information to determine feature positions;
identifying features common to one or more of the plurality of frames; and
computing a location based on the angular information when the visual information fails to distinguish sufficient features to compute a location, the camera further comprising left and right cameras, computing the location information further including modeling camera observations as a three dimensional vector having a first component, a second component and a third component, wherein the first component and the second component represent a pixel location of a feature as observed by the left camera and the third component is a pixel location within a row corresponding to the feature observed by the right camera;
the controller configured to map the computed location to a world frame based on true locations in the indoor environment; and
an output device for rendering, based on the mapped location, a position in the indoor environment.

13. The device of claim 12 wherein the controller is further configured to
receive the visual information and angular information periodically based on an advancement of the camera coordinate frame and the inertial coordinate frame through the indoor environment; and
compute the location based on relative movement of the camera coordinate frame and the inertial coordinate frame between the periodic receipt of the visual information and the angular information.

14. The device of claim 13 further comprising a visual sensory device and an angular sensory device disposed on a vehicle, and disposing the vehicle through the indoor environment for receiving the visual information and the angular information as the vehicle is disposed at different locations.

15. The device of claim 14 wherein the visual sensory device further comprises a stereo camera arrangement including a right camera and a left camera.

16. The device of claim 14 wherein:
the visual sensory device is a camera and the visual information are camera frames; and
the angular sensory device is a gyroscope and the angular information is angular momentum, the controller further operable to
compute a location based on the angular information when there are no distinguishable features in a succession of the plurality of frames.

17. The device of claim 13 wherein the controller is responsive to an initially calibration of the camera frame and the inertial frame at a common location for computing the angular information relative to the initial calibration positioning.

18. A computer program product on a non-transitory computer readable storage medium having instructions that, when executed by a processor, perform a method for computing a localization path through an indoor environment, the method comprising:
retrieving visual information indicative of a location in a camera coordinate frame, the visual information including a plurality of successive frames received from the camera;
computing angular information indicative of a location in an inertial coordinate frame, the angular information indicative of a change in pose of the camera between the frames;
coalescing the visual information and the angular information to compute a location, further comprising:
performing feature detection on the retrieved visual information to determine feature positions;

identifying features common to one or more of the plurality of frames; and computing a location based on the angular information when the visual information fails to distinguish sufficient features to compute a location, the camera further comprising left and right cameras, computing the location information further including modeling camera observations as a three dimensional vector having a first component, a second component and a third component, wherein the first component and the second component represent a pixel location of a feature as observed by the left camera and the third component is a pixel location within a row corresponding to the feature observed by the right camera;

mapping the computed location to a world frame based on true locations in the indoor environment; and rendering, based on the mapped location, a position in the indoor environment.

* * * * *